(12) United States Patent
Janoska et al.

(10) Patent No.: US 6,487,210 B1
(45) Date of Patent: Nov. 26, 2002

(54) METHOD AND APPARATUS FOR HIGH BANDWIDTH MULTI-SOURCE INTERCONNECTION USING POINT-TO-POINT BUSES

(75) Inventors: Mark William Janoska, Carleton Place (CA); Albert D. Heller, Kanata (CA); Henry Chow, Kanata (CA)

(73) Assignee: Alcatel Canada Inc., Kanata (CA)

(*) Notice: Subject to any disclaimer, the term of this patent is extended or adjusted under 35 U.S.C. 154(b) by 0 days.

(21) Appl. No.: 09/275,677

(22) Filed: Mar. 24, 1999

(51) Int. Cl.[7] ............................................... H04L 12/00
(52) U.S. Cl. ...................................... 370/412; 370/418
(58) Field of Search ................................. 370/412–418

(56) References Cited

U.S. PATENT DOCUMENTS

| | | | |
|---|---|---|---|
| 5,179,552 A | * | 1/1993 | Chao .......................... 370/352 |
| 6,118,786 A | * | 9/2000 | Tiernan et al. ............... 370/416 |

* cited by examiner

*Primary Examiner*—Melvin Marcelo

(57) ABSTRACT

A method and apparatus for a high bandwidth multi-source interconnection using point-to-point buses that may be utilized in a communication switch is presented. In the communication switch, a number of output buffers are included to correspond to the outputs of the switch. Each output receives data from a number of different inputs to the switch. Each output buffer includes a plurality of queuing elements where each queuing element receives data from at least one of the inputs and buffers the data prior to insertion into an output data stream corresponding to the output of the output buffer. The plurality of queuing of elements are intercoupled in a daisy chain configuration such that a daisy chain output of one queuing element is coupled to the daisy chain input of the succeeding queuing element. The daisy chain configuration provides a data path through which a data stream that becomes the output of the output buffer is carried. A chain master queuing element at the head of the daisy chain inserts idles into the data stream unless an arbiter has instructed it to insert data that it has received from its corresponding inputs. Succeeding queuing elements on the daisy chain then receive the data stream and insert their data at the appropriate time determined by the arbitration grants received from the arbiter.

20 Claims, 5 Drawing Sheets

METHOD AND APPARATUS FOR HIGH BANDWIDTH MULTI-SOURCE INTERCONNECTION USING POINT-TO-POINT BUSES

FIELD OF THE INVENTION

The invention relates generally to communication systems and more particularly to a method and apparatus for a high bandwidth multi-source interconnection that may be used in a communication network switch.

BACKGROUND OF THE INVENTION

Data communication systems such as packet-based and cell-based communication systems send packets or cells of data through a network of switches. Each of the switches in the network is typically capable of receiving input data from a number of different sources and providing this input data to a number of different outputs. In doing so, the switch must be capable of buffering received data until it is possible to output that data on the appropriate output. Thus, a number of different output buffers are typically included within a switch where each output buffer corresponds to one of the outputs of the switch. The output buffer for a particular output recognizes data intended for that output from all of the received input sets of data and buffers the appropriate data until it can be inserted in the data stream provided on the corresponding output.

Output buffers typically include queuing elements that receive input data from one or more of the inputs to the switch. Each queuing element buffers the appropriate data received from the inputs and provides it such that it is combined with data from a number of other queuing elements to produce the output data stream. In order to control insertion of data to the output data stream by the plurality of queuing elements in a single output buffer, various prior art combination schemes have been developed.

One prior art scheme couples the outputs of all of the queuing elements together in a wired-OR configuration. An arbiter then controls when each of the queuing elements is able to assert its data on the wired-OR output, thus causing the output data stream to be generated based on the individual queuing elements independently driving the output. A block diagram of this prior art solution is illustrated in FIG. 3. One of the problems associated with this prior art solution is the degradation of the output signal based on reflections and other impedance mismatch artifacts that occur in a multi-source high-speed output. These effects can be substantial in switches that may be operating at a 5 Gigabits/second clocking rate. Another problem that arises is the inability to pinpoint faults that may arise in the circuit, as the outputs of all the queuing elements are connected.

In order to avoid the problems associated with the wired-OR solution illustrated in FIG. 3, an active device, such as a multiplexor, can be included in the system to insure a point-to-point connection between the queuing element and the active device. This point-to-point connection avoids the problems with impedance mismatches along a high-speed data line that was presented in the prior art implementation of FIG. 3. An example of a prior art solution utilizing an active device is illustrated in FIG. 4. The problems associated with this prior art solution include the requirement for an additional active device, such as the multiplexor 90 illustrated in FIG. 4. In addition to this, considering that each of the data connections between the queuing elements and the active device are often on the order of 16 bits, the number of tracks required to make these point-to-point connections in a printed circuit (PC) board implementation can be substantial. Thus, the tracks on the PC board can make the area required for such a circuit both overly expensive and complex.

Therefore, a need exists for a method and apparatus to allow high-speed multi-source interconnections using point-to-point buses that do not require the large number of tracks associated with prior art PC board implementations.

DETAILED DESCRIPTION OF A PREFERRED EMBODIMENT OF THE INVENTION

Generally, the present invention provides a method and apparatus for a high bandwidth multi-source interconnection using point-to-point buses that may be utilized in a communication switch. In the communication switch, a number of output buffers are included to correspond to the outputs of the switch. Each output receives data from a number of different inputs to the switch. Each output buffer includes a plurality of queuing elements where each queuing element receives data from at least one of the inputs and buffers the data prior to insertion into an output data stream corresponding to the output of the output buffer. The plurality of queuing of elements are intercoupled in a daisy chain configuration such that a daisy chain output of one queuing element is coupled to the daisy chain input of the succeeding queuing element. The daisy chain configuration provides a data path through which a data stream that becomes the output of the output buffer is carried. A chain master queuing element at the head of the daisy chain inserts idles into the data stream unless an arbiter has instructed it to insert data that it has received from its corresponding inputs. Succeeding queuing elements on the daisy chain then receive the data stream and insert their data at the appropriate time determined by the arbitration grants received from the arbiter.

The daisy chain configuration allows for a point-to-point connection between each of the queuing elements such that the problems with impedance mismatch of the wired-OR prior art configuration are avoided. Similarly, no extra active devices such as the multiplexor in the other prior art solution are required. In a PC board implementation, each of the queuing element application specific integrated circuits (ASICs) can be positioned such that the connections between the queuing elements are short. This avoids the problem of a large number of longer tracks routed across the PC board that existed in the prior art solution where each of the queuing elements was coupled to the active device.

Figure 1:
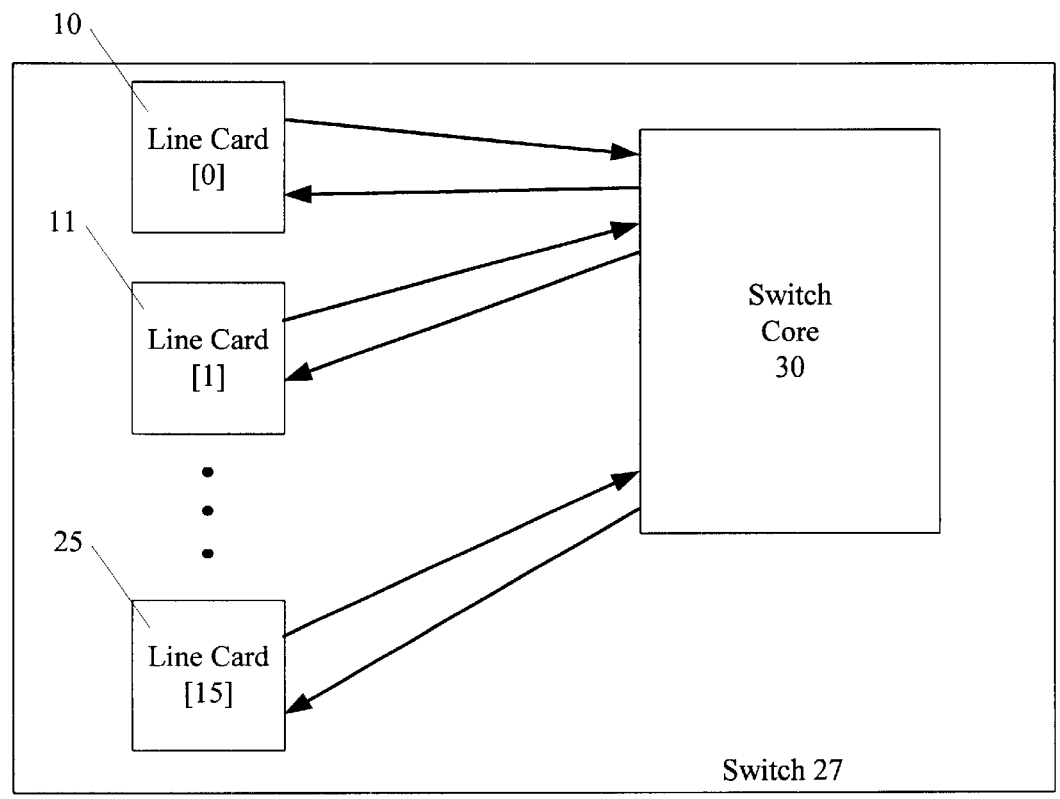
FIG. 1 illustrates a block diagram of a communication switch in accordance with the present invention.

The invention can better understood with reference to FIGS. 1–9. FIG. 1 illustrates a switch 27 that includes a switch core 30 and a plurality of line cards 10–25. The switch 27 may be a switch used in a cell-based communication system or a packet-based communication system such as an ATM communications network. Each of the line cards 10–25 is bidirectionally coupled to the switch core 30 such that the data received by the line card can be provided to the switch core 30 and directed to another line card for output. Thus, inputs received from one line card should be capable of being provided as an output to any of the line cards.

Figure 2:
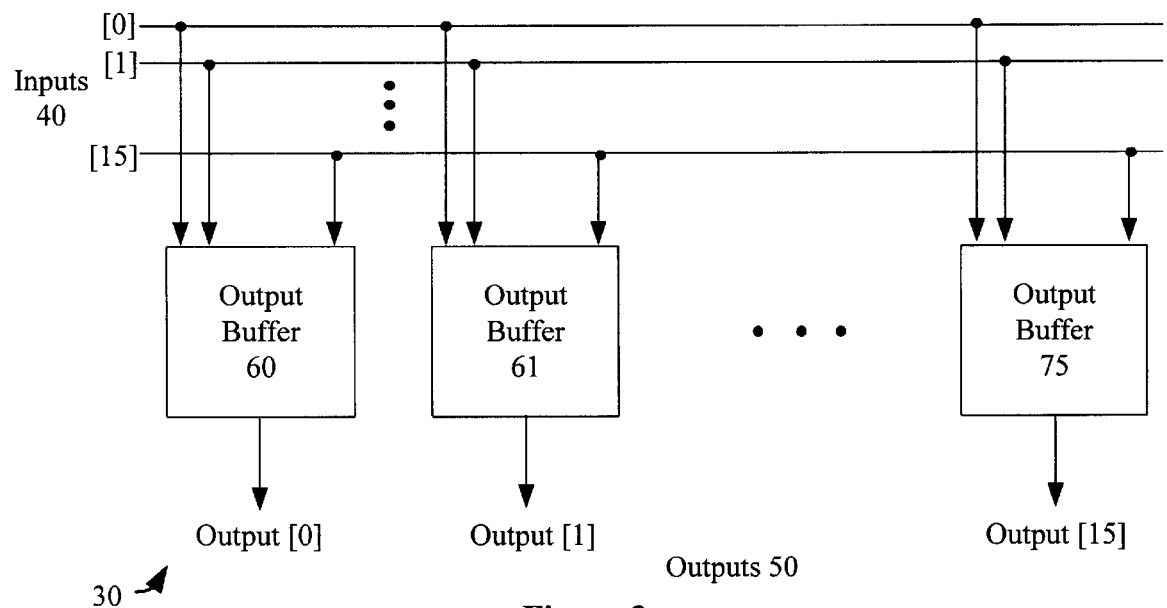
FIG. 2 illustrates a block diagram of a switch core in accordance with the present invention.

FIG. 2 illustrates a block diagram of a switch core 30 that includes a plurality of output buffers 60–75. The switch core illustrated is a 16×16 switch core in that it receives 16 inputs 40 and provides 16 outputs 50. Each of the output buffers 60–75 is coupled to all of the inputs 40. Each of the output buffers 60–75 determines data received from the inputs 40 that correspond to its corresponding output. Once this determination has been made, the data for the output is buffered within the output buffer and assembled with other received data to produce the output signal.

Figure 3:
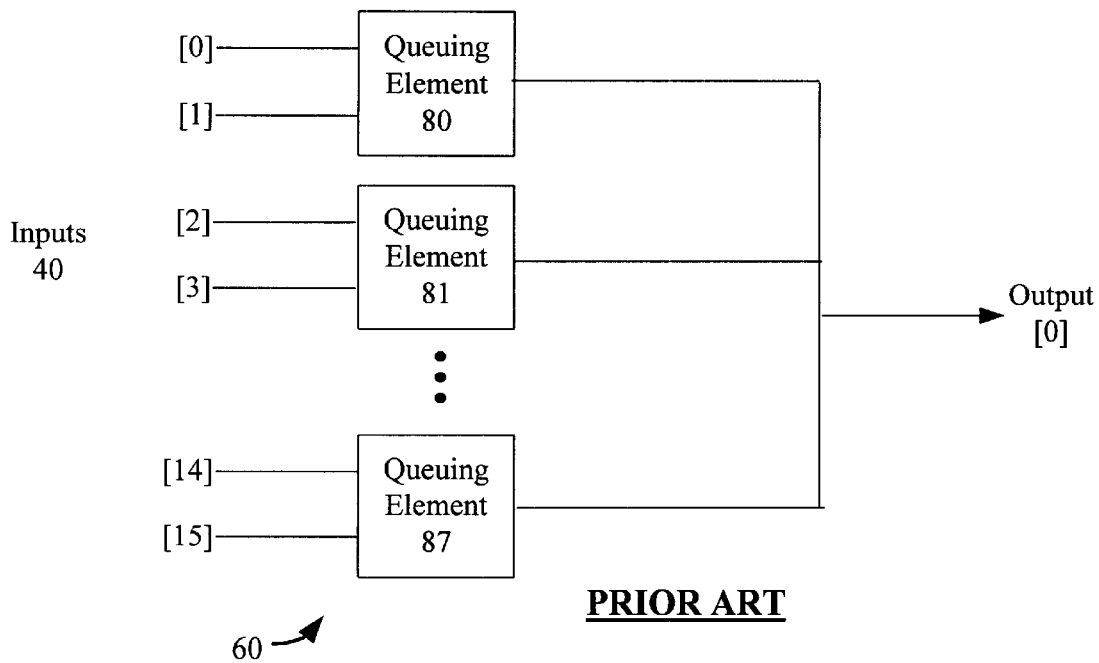
FIG. 3 illustrates a block diagram of a prior art output buffer.
Figure 4:
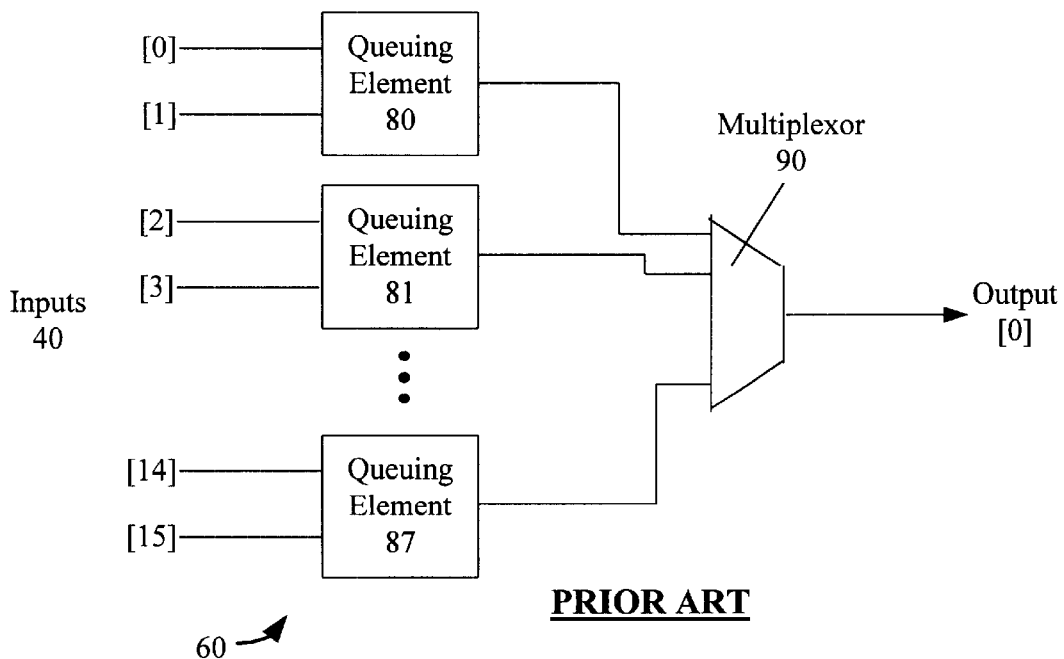
FIG. 4 illustrates a block diagram of another prior art output buffer.

As stated earlier, FIGS. 3 and 4 illustrate prior art output buffers 60. FIG. 3 illustrates the wired-OR implementation of an output buffer 60. The output buffer 60 includes a plurality of queuing elements 80–87 each of which receives two of the inputs 40. The queuing elements are typically coupled to an arbiter or other device that informs the elements when they are to drive the shared output connection. As stated earlier, the primary problem encountered with this implementation is the degradation of the output signal due to reflections and other artifacts of impedance mismatching that occur when a number of different entities attempt to drive a single output at a very high data rate. Another problem with this prior art solution is difficulty in fault detection.

FIG. 4 illustrates the prior art solution that includes the plurality of queuing elements 80–87 and an active device, such as the multiplexor 90. Each of the queuing elements 80–87 is shown to receive two of the inputs 40. These queuing elements then provide the received data as an input to the multiplexor 90, which selects which of the queuing elements is enabled onto the output signal. As stated earlier, although the problems with impedance mismatches are resolved with the point-to-point connections in the output buffer of FIG. 4, the number and potential length of traces required to make the point-to-point connections are substantial. Similarly, the addition of the multiplexor 90 or other active device to the circuit also increases circuit complexity and cost. The invention described herein overcomes the problems associated with the output buffers of FIGS. 3 and 4.

Figure 5:
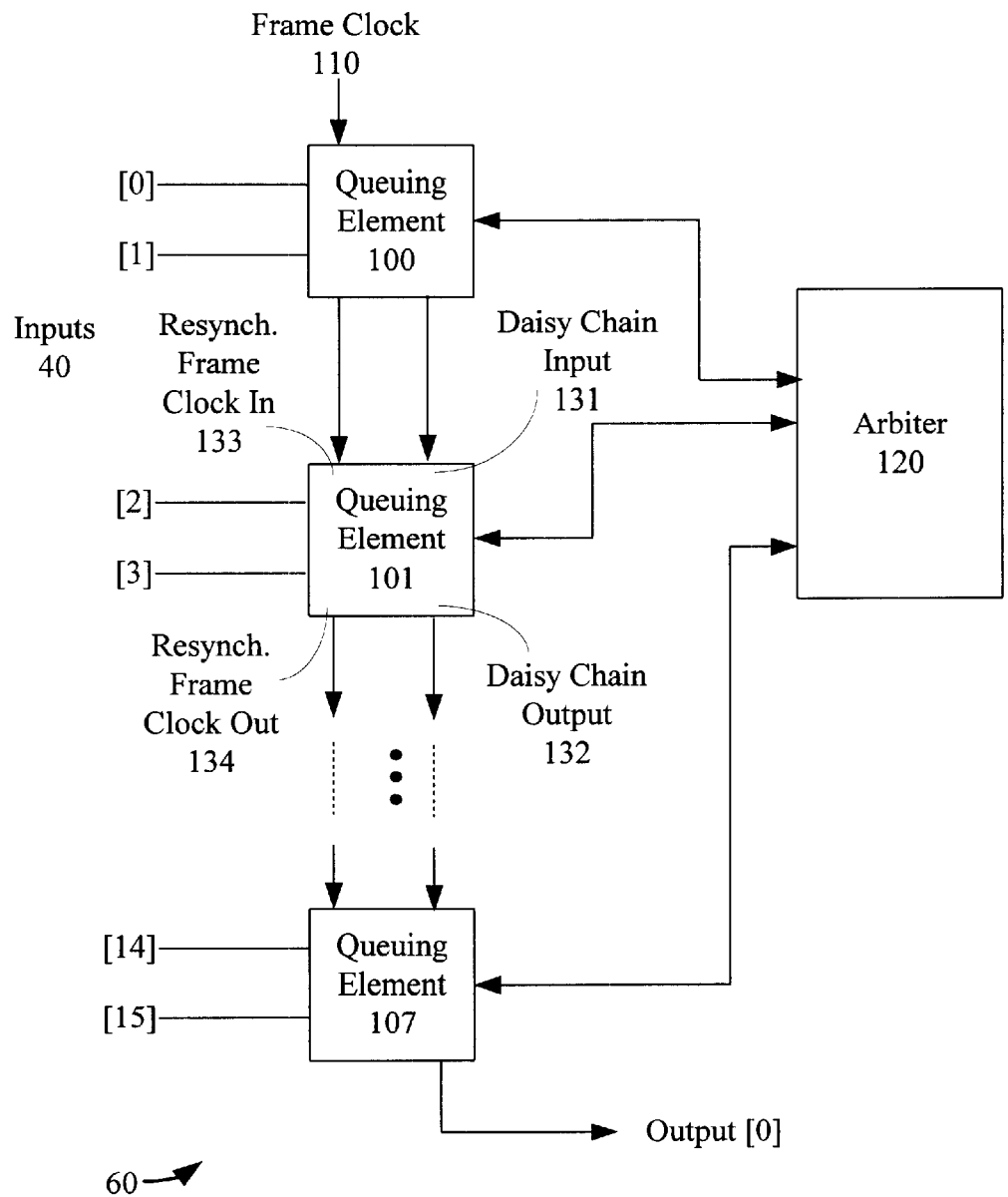
FIG. 5 illustrates a block diagram of an output buffer in accordance with the present invention.

FIG. 5 illustrates an output buffer 60 in accordance with the present invention that includes a plurality of queuing elements 100–107, and an arbiter 120. Preferably, each queuing element is implemented as an application-specific integrated circuit (ASIC). As is illustrated, the queuing elements 100–107 are connected in a serial daisy chain, where the queuing element 100 is at the top of the chain, and the queuing element 107 is at the bottom of the chain. The queuing element 100 is also referred to as the chain master queuing element, as it is at the head of the daisy chain, and initiates the data stream that is passed through the daisy chain to become the output (shown as Output [0]) of the output buffer 60. The chain master queuing element includes at least a first data input and a daisy chain output. The chain master queuing element receives data from a first source via the first data input. The chain master queuing element 100 of FIG. 5 includes a first and a second data input, wherein each of the first and second data inputs are coupled to one of the input buses 40 to the switch. The chain master queuing element of FIG. 5 is shown to be coupled to inputs [0] and [1], but it should be understood that the chain master queuing element could be coupled to any of the inputs 40.

The daisy chain output of the chain master queuing element is the beginning of the data path that is used to carry the data stream that becomes the output of the output buffer 60. The chain master queuing element 100 receives data from the two inputs to which it is coupled, and buffers the data to be provided on the corresponding output for the output buffer 60 prior to including it in the output data stream. The chain master queuing element 100 receives arbitration information from the arbiter 120 and inserts the data it receives from the inputs into the data stream based on the arbitration information.

Figure 6:
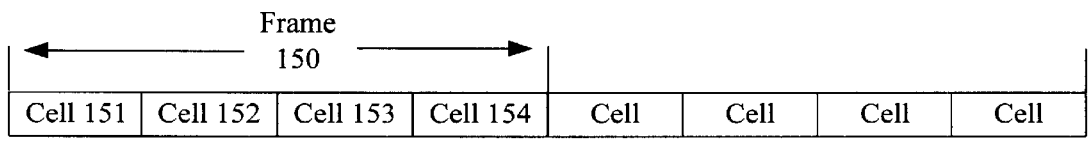
FIG. 6 illustrates a diagram showing frame division in accordance with the present invention.

The insertion of the data into the data stream is also based on a frame clock 110, which is received by the chain master queuing element. The framing signal received via the frame clock 110 defines frames in the data stream, where admission granularity is based on frames. In other words, the frame defines a portion of the data stream into which each of the queuing elements can insert data. The granularity of the insertion may be smaller than a complete frame, and is preferably a cell, where a plurality of cells are included in a frame. FIG. 6 illustrates an example frame 150 and a number of cells 151–154 that make up the frame 150. Note that the number of cells included in the frame period 150 is four, but it should be apparent to one of ordinary skill in the art that the number of cells could be any number appropriate for a particular application.

The chain master queuing element 100 receives the framing signal via the frame clock 110 and inserts data received from the one or more input sources into the data stream based on arbitration information and preferably the framing signal. The chain master queuing element inserts idle data sets into the data stream when the arbitration information indicates that the chain master queuing element cannot insert data from its corresponding input data sources. Thus, each of the cells within a particular frame period will be filled by the chain master queuing element with idle data sets unless the chain master queuing element has received arbitration information enabling it to insert data received from one of its corresponding data sources.

The plurality of queuing elements 101–107 that comprise the remainder of the daisy chain of queuing elements are coupled to the chain master queuing element such that the chain master queuing element forms the head of the daisy chain. Preferably, each of the queuing elements is coupled to two of the inputs 40 such that a total of eight queuing elements will be required in an output buffer of a 16-input switch. Each of the plurality of queuing element 101–107 receives data on its data input from a corresponding source, which is preferably one of the inputs 40 to the switch core. The queuing elements illustrated in FIG. 5 include two inputs per queuing element. Each of the queuing elements 101–107 includes at least a first data input, a daisy chain input, and a daisy chain output. The preferred implementation of two inputs per queuing element is due to current memory bandwidth limitations. As such, it should be understood that each queuing element may have a greater or smaller number of data inputs based on both memory bandwidth limitations and the particular application within which the queuing element is being used. For example, each of the queuing elements may receive data on N data inputs from N sources, and insert the data from the N sources into the data stream based on the arbitration information.

As stated earlier, the plurality of queuing elements 101–107 is intercoupled in a daisy chain such that the daisy chain input of each succeeding queuing element is operably coupled to the daisy chain output of each preceding queuing element. The daisy chain input 131 of the first queuing element 101 is operably coupled to the daisy chain output of the chain master queuing element 100, and the daisy chain output of a last queuing element 107 of the daisy chain provides an output signal from the output buffer 60, shown as output [0].

Each of the plurality of queuing elements inserts the data it receives from its corresponding sources into the data stream being passed along the daisy chain data path based on the arbitration information which is preferably provided by the arbiter 120. When the daisy chain queuing elements receive data to be included in the data stream, they preferably request an arbitration grant from the arbiter 120 that will enable them to include the received data into the output data stream.

The arbiter 120 receives these requests from the queuing elements and provides the arbitration information to the queuing elements, which include the chain master queuing element, such that they may determine when it is appropriate to include their data in the data stream. The actual inclusion of the data in the data stream is further discussed with respect to FIG. 7 below. The arbitration performed by the arbiter 120 may be based on a round robin scheme or some other priority scheme. Thus, the arbiter 120 may receive requests from many of the queuing elements but give preference to a subset of the queuing elements such that their data is delivered to the output in a more timely fashion. It should be obvious to one of ordinary skill in the art that the arbitration performed by the arbiter 120 may be configured such that it is appropriate for the particular application in which the output buffer is employed.

Each of the queuing elements 101–107 that is downstream from the chain master queuing element 100 resynchronizes the framing signal that it receives from its upstream neighbor in the daisy chain. As such, the framing signal provided to each queuing element is synchronized with the data stream such that insertion of data into the data stream is uniformly controlled throughout the daisy chain. As such, each of the queuing elements 101–107 preferably includes a resynchronized framing clock input, such as the resynchronized frame clock input 133 of queuing element 101, and provides the resynchronized framing signal on a resynchronized frame clock output, such as resynchronized frame clock output 134 of queuing element 101. The resynchronization of the framing clock is due to the delay experienced by the framing clock and the data stream as it passes through the queuing element.

Figure 7:
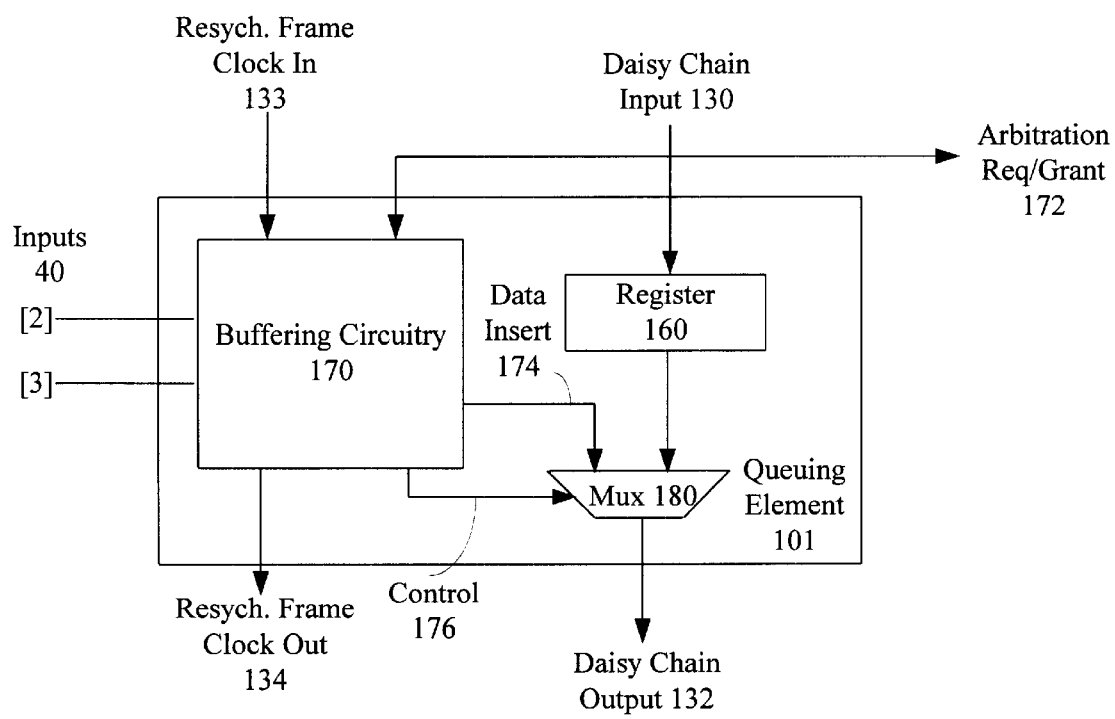
FIG. 7 illustrates a block diagram of a queuing element in accordance with the present invention.

In order to understand the workings of each of the queuing elements, a block diagram of a queuing element is illustrated in FIG. 7. The queuing element 101 includes buffering circuitry 170, a register 160, and a multiplexor 180. The daisy chain input 131 provided to the queuing element 101 is captured by the register 160. The output of the register 160 provides a first input to the multiplexor 180, whereas a data insert signal 174 from the buffering circuitry 170 provides a second input to the multiplexor 180. The buffering circuitry 170 buffers received data from the inputs, and provides this data to the multiplexor 180 based on arbitration information requested and received via the arbitration request/grant bus 172 that couples the buffering circuitry to the arbiter 120.

When the buffering circuitry 170 is instructed to insert data at a particular point within a frame, the buffering circuitry 170 asserts a control signal 176 to the multiplexor 180 such that rather than passing data received via the daisy chain input 131 to the daisy chain output 132, the data on the data insert signal 174 is passed. Thus, referring back to FIG. 6, if the queuing element 101 receives arbitration information indicating that it can insert a particular portion of data in cell 152 of the frame period 150, the buffering circuitry will manipulate the multiplexor 180 such that the cells 151, 153, and 154 of the frame period 150 are passed through the multiplexor 180. However, when the cell 152 is received in the register 160, it is stripped off from the data stream and replaced with the data on the data insert bus. Note that the arbitration information concerning a particular frame or other data division within the data stream must be provided to each of the queuing elements prior to reception of the actual portion of the data stream to which data is to be inserted.

Preferably, the queuing element 101 includes diagnostic circuitry that performs a check on data stripped from the data stream. This check determines whether or not the data stripped is an idle data set such that the queuing element 101 can determine whether or not it has correctly replaced idle data in the data stream. If the queuing element 101 strips non-idle data from the data stream, it is an indication that some error has occurred in the system as no two queuing elements should insert data within the same cell of the data stream. Thus, when the chain master queuing element inserts idles into the data stream, it serves the purpose of providing a benchmark for comparison at each queuing element to determine whether or not idle data is being replaced. This allows for better fault detection, which was not possible in prior art solutions such as the wired-OR implementation.

Because the daisy chain intercoupling of the queuing elements allows them to be placed in close proximity on a printed circuit board, the data paths between the individual queuing elements are kept to a minimum length. Combining this with the fact that each of these connections between the queuing elements is a point-to-point connection overcomes the disadvantages presented by prior art solutions. Further benefit can be derived by buffering input data for two outputs in a single queuing element, where the data stream for a first one of the outputs flows in one direction along the daisy chain, whereas the data stream for the other output flows in the opposite direction. This further optimizes the queuing element placement on the printed circuit board, and further minimizes the number of components and traces that must exist in the switch core. Note that minimization of the traces and length of paths on the printed circuit board is motivated by the high speed of the data bus carrying the data stream, which can approach 5 Gigabits/second.

Figure 8:
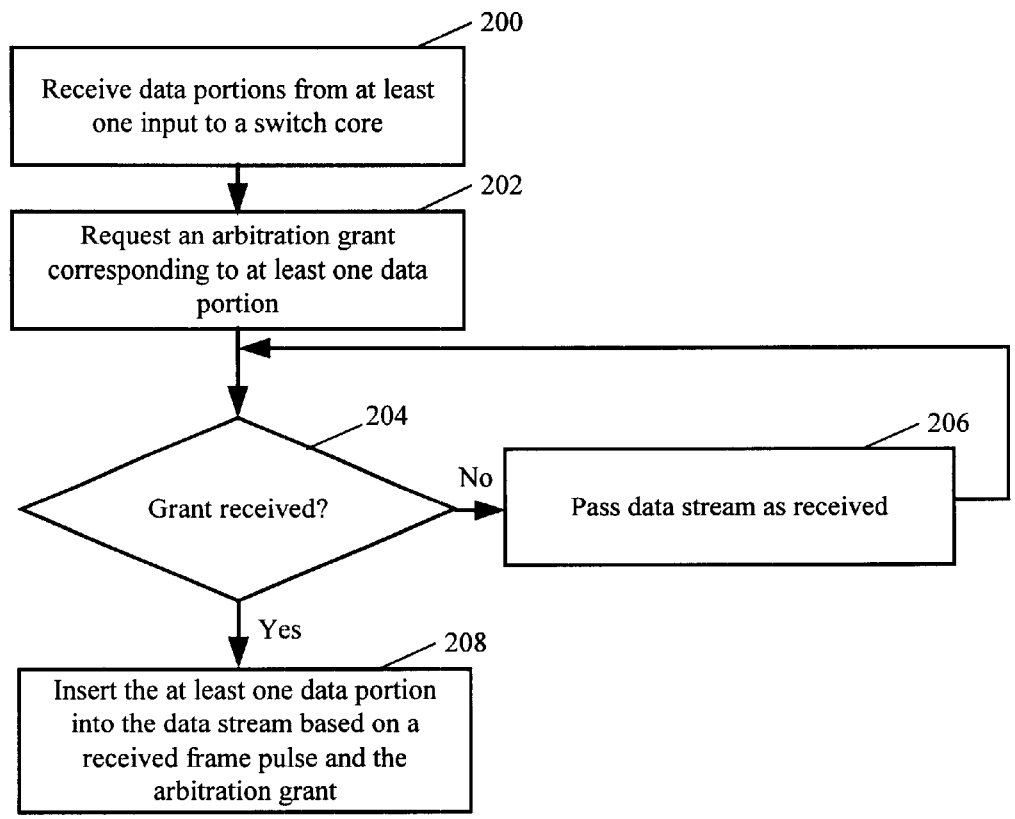
FIG. 8 illustrates a flow diagram of a method for buffering outputs in a switch core in accordance with the present invention.

FIG. 8 illustrates a flow diagram of a method for buffering outputs in a switch core. The method begins at step 200 where data portions are received on at least one input to the switch core. Preferably, a particular queuing element will receive data portions from two, and possible more than two, inputs to the switch core. The data portions may be data packets in a packet-based communications network or data cells in a cell-based network. At step 202, an arbitration grant corresponding to at least one data portion of the received data portions is requested. This arbitration grant request is preferably made to an arbiter that controls insertion of data to the data stream for the entire output buffer.

At step 204, it is determined whether or not the arbitration grant has been received. If the arbitration grant has not been received, the method proceeds to step 206 where the data stream received by the queuing element is passed through without modification. Preferably, this is accomplished using a multiplexor as was described in the discussion of FIG. 7. Note that in the case of the chain master queuing element, step 206 may include inserting idle data sets into the data stream. The insertion of idle data sets is used to initialize the data stream to an all-idle condition with the exception of data portions inserted by the chain master queuing element.

If it is determined at step 204 that the arbitration grant has been received, the at least one data portion of the data portions received are inserted into the data stream based on a frame pulse. Preferably, the frame pulse is passed through the daisy chain queuing elements in the manner described with respect to FIG. 6 such that the frame pulse is resynchronized in each queuing element. As stated earlier, the frame pulse, or framing signal, determines the boundaries of individual frames within the data stream. As before, each frame may include a number of cells, where a cell may represent the minimal dimension of inserted data possible. The stream divisions corresponding to the cells or frames in the data stream are used by the queuing element to perform the insertion.

Figure 9:
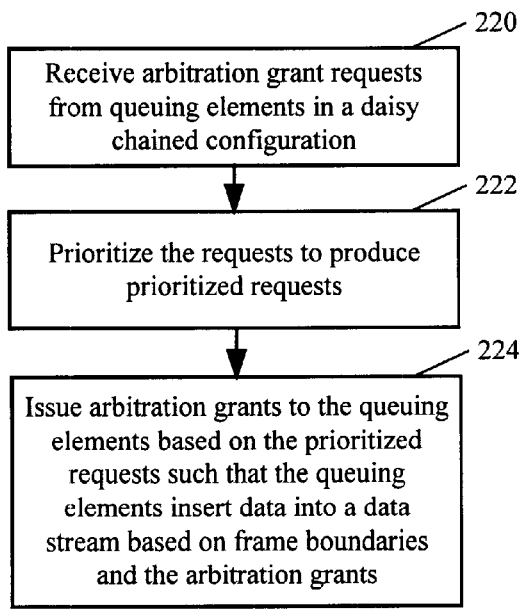
FIG. 9 illustrates a flow diagram of a method for controlling a daisy-chained set of queuing elements in accordance with the present invention.

FIG. 9 illustrates a method for controlling a daisy chained set of queuing elements. The method begins at step 220, where arbitration grant requests are received from queuing elements in the daisy chained set of queuing elements. These grant requests correspond to the queuing elements having data that they wish to include in the output data stream of the output buffer. At step 222, the requests are prioritized to produce prioritized requests. The prioritization performed at step 222 is based on a prioritization scheme and available bandwidth along the data stream that is passed through the daisy chained set of queuing elements. As stated earlier, the prioritization scheme may be as simple as a round-robin scheme or may have some type of weighted effect such that some data sources receive preferential treatment.

At step 224, arbitration grants are issued to the queuing elements based on the prioritized requests such that the queuing elements insert data into the data stream based on frame boundaries and the arbitration grants. As described with respect to FIG. 8, the arbitration preferably controls insertion of data into the data stream to a level of granularity that corresponds to cells that make up a frame. In other embodiments, the arbiter may perform the arbitration based on a frame-by-frame basis rather then on a cell-by-cell basis such that the minimal amount of data inserted into the data stream is equivalent to the data for a frame rather than a cell.

It should be understood that the implementation of variations and modifications of the invention and its various aspects will be apparent to those of ordinary skill in the art and that the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. An output buffer of a switch core, comprising:
a chain master queuing element, wherein the chain master queuing element includes a first data input and a daisy chain output, wherein the chain master queuing element receives data from a first source via the first data input, wherein the chain master queuing element inserts the data from the first source into a data stream provided on the daisy chain output based on arbitration information; and a plurality of queuing elements, wherein each queuing element of the plurality of queuing elements includes a first data input, a daisy chain input, and a daisy chain output, wherein the plurality of queuing elements are intercoupled in a daisy chain such that the daisy chain input of each succeeding queuing element is operably coupled to the daisy chain output of each preceding queuing element, wherein the daisy chain input of a first queuing element in the daisy chain is operably coupled to the daisy chain output of the chain master queuing element, wherein the daisy chain output of a last queuing element in the daisy chain provides an output signal from the output buffer, wherein each of the plurality of queuing elements receives data on the data input from a first corresponding source of a first plurality of corresponding sources, wherein each corresponding source of the first plurality of corresponding sources corresponds to one of the plurality of queuing elements, wherein each of the plurality of queuing elements inserts the data from the first corresponding source into the data stream based on the arbitration information.

2. The output buffer of claim 1 further comprises an arbiter operably coupled to the chain master queuing element and the plurality of queuing elements, wherein the arbiter receives data transmission requests from the chain master queuing element and the plurality of queuing elements, wherein the arbiter provides the arbitration information to the chain master queuing element and the plurality of queuing elements based on the data transmission requests and a service preference scheme.

3. The output buffer of claim 2, wherein each of the queuing elements, including the chain master queuing element, includes memory for buffering data received from the sources.

4. The output buffer of claim 2, wherein the chain master queuing element inserts idle data sets in the data stream when the arbitration information indicates that the chain master queuing element cannot insert data from the first source.

5. The output buffer of claim 4, wherein each of the queuing elements includes diagnostic circuitry that detects when data inserted into the data stream replaces data other than an idle data set.

6. The output buffer of claim 2, wherein the chain master queuing element further comprises a second data input, wherein the chain master queuing element receives data from a second source via the second data input, wherein the chain master queuing element inserts the data from the second source into the data stream based on the arbitration information; and wherein each of the plurality of queuing elements further includes a second data input, wherein each of the plurality of queuing elements receives data from a corresponding second source of a second plurality of corresponding sources, wherein each corresponding source of the second plurality of corresponding sources corresponds to one of the plurality of queuing elements, wherein each of the plurality of queuing elements inserts the data from the second corresponding source into the data stream based on the arbitration information.

7. The output buffer of claim 2, wherein the chain master queuing element further comprises N data inputs, wherein the chain master queuing element receives data from N sources via the N data inputs, wherein the chain master queuing element inserts data from the N sources into the data stream based on the arbitration information; and wherein each of the plurality of queuing elements further includes N data inputs, wherein each of the plurality of queuing elements receives data from N corresponding sources, wherein each of the plurality of queuing elements inserts the data from the N corresponding sources into the data stream based on the arbitration information.

8. The output buffer of claim 2, wherein each of the plurality of queuing elements, including the chain master queuing element, further comprises a frame clock input and a frame clock output, wherein the frame clock input of the first queuing element is operably coupled to the frame clock output of the chain master queuing element, wherein the frame clock input of each successive queuing element in the daisy chain is operably coupled to the frame clock output of each preceding queuing element in the daisy chain, wherein the frame clock input of the chain master queuing element receives a framing signal, wherein each queuing element regenerates the framing signal and provides the framing signal on the frame clock output, wherein each queuing element of the plurality of queuing elements, including the chain master queuing element, inserts the data into the data stream at a time interval based on the framing signal received via the frame clock input.

9. The output buffer of claim 8, wherein the framing signal defines frames in the data stream, wherein admission granularity is based on frames.

10. The output buffer of claim 9, wherein each frame includes a plurality of cells, wherein a cell designates the minimal dimension of inserted data.

11. The output buffer of claim 10, wherein the output buffer is included in a data communications network.

12. The output buffer of claim 11, wherein the output buffer is included in an asynchronous transfer mode switch.

13. A switch core, comprising:

a plurality of output buffers, wherein each output buffer of the plurality of output buffers corresponds to an output of the switch core, wherein each output buffer receives data from a plurality of inputs of the switch core, wherein each of the output buffers utilizes a daisy chained set of queuing elements to generate an output data stream for a corresponding output of the switch core from the data received from the plurality of inputs for the corresponding output.

14. The switch core of the claim 13, wherein each of the output buffers further comprises an arbiter operably coupled to the daisy chained set of queuing elements, wherein the arbiter controls insertion of the data received from the plurality of inputs into the output data stream for the corresponding output of the switch core.

15. The switch core of claim 14, wherein the arbiter receives insertion requests from the queuing elements in an output buffer and provides arbitration information that controls insertion of the data by each queuing element.

16. The switch core of claim 15, wherein each of the queuing elements is a 2:1 queuing element that receives data from two of the plurality of inputs for the corresponding output for the output buffer in which the queuing element is included.

17. The switch core of claim 13, wherein the plurality of output buffers further comprises 16 output buffers corresponding to 16 outputs of the switch core, wherein the output data streams for the outputs are generated from data received from 16 inputs.

18. A method for buffering outputs in a switch core, comprising:

receiving data portions from at least one input to the switch core;

requesting an arbitration grant corresponding to at least one data portion of the data portions;

receiving the arbitration grant;

receiving a data stream and a frame pulse, wherein the frame pulse divides the data stream into stream divisions; and inserting the at least one data portion into the data stream based on the frame pulse, wherein inserting further comprises replacing portions of the data stream with the at least one data portions at a stream division corresponding to the arbitration grant and passing portions of the data stream corresponding to other stream divisions.

19. The method of claim 18 further comprises resynchronizing the frame pulse to produce a resynchronized frame pulse that is passed along with the data stream to a downstream queuing element that utilizes the resynchronized frame pulse to insert data portions from other inputs into the data stream.

20. A method for controlling a daisy chained set of queuing elements comprising:

receiving arbitration grant requests from queuing elements in the daisy chained set of queuing elements;

prioritizing the requests to produce prioritized requests, wherein the prioritization is based on a prioritization scheme and available bandwidth along a data stream that passes through the daisy chained set of queuing elements; and issuing arbitration grants to the queuing elements based on the prioritized requests such that the queuing elements insert data into the data stream based on frame boundaries and the arbitration grants.

* * * * *